US011905121B2

(12) United States Patent
Essbach et al.

(10) Patent No.: US 11,905,121 B2
(45) Date of Patent: Feb. 20, 2024

(54) APPARATUS FOR TURNING ELONGATE OBJECTS

(71) Applicant: SOMIC VERPACKUNGSMASCHINEN GMBH & CO. KG, Amerang (DE)

(72) Inventors: Christian Essbach, Trostberg (DE); Alexander Riegel, Rosenheim (DE); Josef Lipp, Ramerberg (DE)

(73) Assignee: SOMIC VERPACKUNGSMASCHINEN GMBH & CO. KG, Amerang (DE)

( * ) Notice: Subject to any disclaimer, the term of this patent is extended or adjusted under 35 U.S.C. 154(b) by 0 days.

(21) Appl. No.: 17/779,952

(22) PCT Filed: Jul. 10, 2020

(86) PCT No.: PCT/EP2020/069571
§ 371 (c)(1),
(2) Date: May 25, 2022

(87) PCT Pub. No.: WO2021/104687
PCT Pub. Date: Jun. 3, 2021

(65) Prior Publication Data
US 2022/0411195 A1 Dec. 29, 2022

(30) Foreign Application Priority Data
Nov. 25, 2019 (DE) .................... 10 2019 218 190.2

(51) Int. Cl.
*B65G 33/02* (2006.01)
*B65G 33/04* (2006.01)
(52) U.S. Cl.
CPC ............. *B65G 33/02* (2013.01); *B65G 33/04* (2013.01)

(58) Field of Classification Search
CPC ...... B65G 33/02; B65G 47/244; B65G 33/04; B65B 2220/20; B65B 35/30; B65B 35/58
(Continued)

(56) References Cited

U.S. PATENT DOCUMENTS 2,890,787 A * 6/1959 Carter ....................... B65C 9/06
156/DIG. 27
3,467,237 A 9/1969 Hanekamp et al.
(Continued)

FOREIGN PATENT DOCUMENTS

CN 106429356 A 2/2017
DE 102010012407 A1 9/2011
(Continued)

OTHER PUBLICATIONS

International Application No. PCT/EP2020/069571, International Search Report and Written Opinion dated Jun. 3, 2021, 14 pages.

*Primary Examiner* — Mark A Deuble
(74) *Attorney, Agent, or Firm* — Kilpatrick Townsend & Stockton LLP

(57) ABSTRACT

An apparatus for turning elongate objects conveyed into a discharge orientation. The apparatus includes a feed device and a turning worm screw. The turning worm screw comprises at least one worm channel open radially outwards and is delimited by a feed side delimiting wall, discharge side delimiting wall, and a radially inner circumferential wall. Both the feed side delimiting wall and the discharge side delimiting wall have a screw pitch which reduces from a feed end to a discharge end of the turning worm screw. A feed path of the feed device approaches a feed portion of the turning worm screw to the side. The feed portion adjoins the feed end of the turning worm screw. The apparatus includes a discharge device assigned to the discharge end of the turning worm screw.

25 Claims, 4 Drawing Sheets

(58) Field of Classification Search
USPC .............. 198/459.3, 661, 387, 411, 412, 415
See application file for complete search history.

(56) References Cited

U.S. PATENT DOCUMENTS

| | | | | |
|---|---|---|---|---|
| 4,561,534 A | * | 12/1985 | Nalbach ............... | B65G 47/244 |
| | | | | 198/689.1 |
| 5,542,233 A | * | 8/1996 | Graffin .................. | B67C 7/0046 |
| | | | | 53/367 |
| 5,765,675 A | * | 6/1998 | Draghetti ............... | B65G 33/04 |
| | | | | 198/408 |

FOREIGN PATENT DOCUMENTS

| | | | |
|---|---|---|---|
| EP | 0148355 A1 | 7/1985 | |
| EP | 623534 A2 * | 11/1994 | ........... B65G 47/252 |

* cited by examiner

APPARATUS FOR TURNING ELONGATE OBJECTS

CROSS REFERENCE TO RELATED APPLICATION

This application is a U.S. national phase of International Patent Application No. PCT/EP2020/069571 filed on Jul. 10, 2020, which claims priority to German Patent Application No. 10 2019 218 190.2, filed in Germany on Nov. 25, 2019. The entire contents of both applications are hereby incorporated herein by this reference.

The invention relates to an apparatus for turning elongate objects of which the height is at most as great as their width, which in turn is less than their length, out of a feed orientation, in which the elongate objects are conveyed with their narrow side, corresponding to the width, facing forward, into a discharge orientation, in which the elongate objects are conveyed with their long side, corresponding to the length, facing forward.

Apparatuses of this type are known in the prior art, for example in connection with packaging systems, in particular in the food industry.

When packaging elongate objects of the type mentioned at the outset, preferably elongate objects of which the length is at least twice their width, for example bars, in particular chocolate bars, muesli bars or the like, it is customary to first assemble individual bars, preferably already wrapped in film, into groups of several such bars in order to then be able to store them in packaging intended for retail. However, it should already be pointed out at this point that although the invention will be explained in part using the example of bars for the sake of simplicity, no restriction of any kind can be derived from this.

Before packaging, it is usually necessary—due to previous processing steps—to transfer bars having a feed orientation, in which they are conveyed with their narrow side, corresponding to the width, facing forward, into a discharge orientation, for the purpose of grouping, in which discharge orientation the bars are conveyed with their long side, corresponding to the length, facing forward, and to group said bars in this discharge orientation in such a way that they can be packaged in the desired manner.

For the purpose of transferring the bars from the feed orientation into the discharge orientation, the prior art has proposed generic turning devices in which the bars or the like first run up against a stop element with their narrow side facing forward, which stop element is intended to brake the bars, and are subsequently discharged with a discharge device, for example a conveyor belt, provided in the region of this stop element, which discharge device is offset by approximately 90° to a feed direction of the bars, such that they have the above-mentioned discharge orientation.

However, turning devices of this kind have the disadvantage that, depending on the feed speed, the bars may be damaged during impact with the stop element and the resulting abrupt deceleration, and therefore they no longer meet the aesthetic requirements and, in the worst case, may even break. As a result of this, in order to avoid high reject rates, the feed speed of the bars must be reduced depending on the nature thereof, which, however, considerably limits the maximum possible throughput rates of turning devices of this kind.

The problem addressed by the present invention is therefore that of providing a remedy here.

This problem is solved according to the invention by an apparatus for turning elongate objects of which the height is at most as great as their width, which in turn is less than half the length, out of a feed orientation, in which the elongate objects are conveyed with their narrow side, corresponding to the width, facing forward, into a discharge orientation, in which the elongate objects are conveyed with their long side, corresponding to the length, facing forward, the apparatus comprising a feed device, a turning worm screw and a discharge device, the turning worm screw comprising at least one worm channel, which is open radially outwards and delimited by a feed side delimiting wall, a discharge side delimiting wall and a radially inner circumferential wall, both the feed side delimiting wall and the discharge side delimiting wall of the at least one worm channel having a screw pitch which reduces from a feed end to a discharge end of the turning worm screw, a feed path of the feed device approaching a feed portion of the turning worm screw at the side, which feed portion is adjacent to the feed end of the turning worm screw, and the discharge device being assigned to the discharge end of the turning worm screw.

Since the apparatus according to the invention comprises the turning worm screw having the at least one worm channel formed thereon, the elongate objects, in particular bars, which approach the feed portion of the turning worm screw and have the feed orientation mentioned at the outset, are substantially solely transferred into the discharge orientation by means of the screw pitch of the feed side delimiting wall and the discharge side delimiting wall, which pitch reduces from the feed end to the discharge end of the turning worm screw. The elongate objects are consequently turned continuously, namely substantially by an engagement of their long sides with the feed side delimiting wall and the discharge side delimiting wall of the turning worm screw. As a result of this, damage to the elongate objects is effectively prevented even at high feed speeds. The worm channel preferably has a width that is greater than the width of the elongate object, such that the elongate object rests with one of its long sides either on the feed side delimiting wall or on the discharge side delimiting wall when said objects passes through the worm channel.

The apparatus according to the invention is therefore particularly suitable for processing easily deformable, elongate objects such as bars, which are preferably already packaged in film, for example in a tubular film which has overlapping and sealed ends on its respective narrow sides, or the like, but without being limited to this.

In principle, the at least one worm channel must be designed in such a way that an elongate object that approaches the feed portion of the turning worm screw at the side can enter the region of the worm channel and engage with or be caught by the feed side delimiting wall. In order to allow the elongate object to enter the worm channel from the side with as little disruption as possible even at high feed speeds, it is proposed, according to an embodiment of the invention, that the circumferential angular position of the discharge side delimiting wall of the at least one worm channel on the side of the feed portion of the turning worm screw facing away from the feed end increases, in the circumferential direction, by at least 180° divided by the number of worm channels, i.e. increases by at least 180° in the case of a single worm channel.

Furthermore, in connection with the present invention, it must be taken into account that the feed side delimiting wall must also not stand in the way of the elongate object entering the feed portion. In order to allow the elongate object sufficient time to enter the feed portion, i.e. to provide the largest possible range of angle of rotation of the turning worm screw, over which range the feed portion is not or at least only partially blocked by the feed side delimiting wall, it is proposed, according to a further embodiment of the invention, that the height of the feed side delimiting wall decreases towards the feed end of the turning worm screw.

In order to further counteract the last-mentioned problem with regard to the entry of the elongate object into the feed portion, the feed side delimiting wall side can additionally or alternatively only be provided at a predetermined distance from the feed end of the turning worm screw. The turning worm screw can therefore have a substantially channel-free portion in the region of the feed end, which portion is delimited by neither a feed side delimiting wall nor a discharge side delimiting wall. This channel-free portion can preferably have a diameter which corresponds to the radially inner circumferential wall of the at least one worm channel.

In principle, when feeding the elongate objects from the side, it should be noted that the angle of rotation to be transferred to the elongate objects by the turning worm screw, which angle is required for transferring from the feed orientation into the discharge orientation, is greater the smaller the angle enclosed between a feed direction of the feed path directly upstream of the turning worm screw and an axis of rotation of the turning worm screw. On the other hand, the risk of damage to the elongate objects rises if the angle increases, since when the elongate objects enter the feed portion, the elongate objects must be braked more abruptly in the feed direction. According to a further embodiment, it is therefore proposed that the feed direction of the feed path directly upstream of the turning worm screw encloses a predetermined angle with the axis of rotation of the turning worm screw, which angle is between approximately 20° and approximately 50°, preferably approximately 35°.

In a further development of this embodiment, the predetermined angle between the feed direction of the feed path and the axis of rotation of the turning worm screw can also correspond to the screw pitch of the feed side delimiting wall at the feed end of the turning worm screw. As a result of this, on the one hand it can be ensured that the elongate object substantially rests against this entry side delimiting wall with its entire long side as soon as it is caught by the entry side delimiting wall. On the other hand, due to the frictional engagement between the long side of the elongate object and the entry side delimiting wall, a braking force acting on the elongate objects can be increased, which allows a corresponding increase in the feed speed of the elongate objects.

Furthermore, a discharge direction of the discharge path directly downstream of the turning worm screw encloses a predetermined angle with the axis of rotation of the turning worm screw, which angle is between 0° and approximately 20°, preferably approximately 10°.

Similarly, in a further development of this embodiment, the predetermined angle between the discharge direction of the discharge path and the axis of rotation of the turning worm screw can also correspond to the screw pitch of the discharge side delimiting wall at the discharge end of the turning worm screw. By adjusting the screw pitch at the discharge end to the angle between the discharge direction of the discharge path and the axis of rotation of the turning worm screw, it can finally be ensured that the elongate objects have the discharge orientation mentioned at the outset, in which they are conveyed with their long side facing forward.

In order to be able to reliably release the elongate objects from the worm channel, in a further development of the invention the depth of the worm channel in a portion adjacent to the discharge end decreases in the direction of the discharge end, preferably continuously, from a first depth value to a second depth value.

In order to be able to further increase the feed speed of the elongate objects and thus the throughput rate of the apparatus according to the invention, it is also proposed that the direction of rotation of the turning worm screw is selected in such a way and that the depth of the worm channel is dimensioned in such a way, at least in the feed portion, that the turning worm screw enters into frictional engagement with the elongate objects, which engagement exerts a braking force on said objects. If the elongate objects in this context are of the kind that are already packaged in film and which, for example, have an imprint intended for product identification, it must be taken into account that the frictional engagement may only be so pronounced that the imprint is not damaged as a result of this.

In order to also prevent damage to the long sides of the elongate objects, in particular their packaging, it is also preferred that the feed side delimiting wall e and/or the discharge side delimiting wall have a low-friction surface finish, are preferably provided with a friction-reducing coating. In this case, the coating can be formed, for example, by teflonising or other similar coating methods.

As mentioned above, it can be advantageous to dimension the depth of the worm channel at least in the feed portion in such a way that said channel comes into frictional engagement with the elongate objects as they enter the feed portion, which engagement exerts a braking force on said objects. Further along the worm channel, however, braking of the elongate objects is usually not required, and therefore in order to prevent damage to the elongate objects, it is preferable that the depth of the worm channel in the feed portion of the turning worm screw has a smaller value than further along the turning worm screw.

In order to also be able to ensure that, when the elongate objects are turned, they are guided in a direction orthogonal to the axis of rotation of the turning worm screw, according to a further embodiment of the invention it is proposed that a guide unit, for example a guide sheet or a rotating guide belt, is arranged on the side of the turning worm screw facing the feed path.

In addition or as an alternative, it is also conceivable here that a further guide unit, for example a guide sheet or a rotating guide belt, is arranged on the side of the turning worm screw facing away from the feed path. In addition to further guidance of the elongate objects, at particularly high feed speeds, an optional possibility of stopping the elongate objects when they enter the feed portion can be provided, via which any residual speed in the feed direction can be compensated for. This proves to be particularly advantageous when the elongate objects are already packaged in the tubular film referred to above, since the ends thereof formed on the narrow sides can deform for the purpose of absorbing energy when they come into contact with the further guide unit, without the fear of any undesirable effects on the shape of the elongate objects. If the further guide unit is also a rotating guide belt, which preferably extends in the conveying direction of the turning worm screw and/or moves substantially at the conveying speed of the turning worm screw, friction occurring between the narrow sides and the guide belt can be reduced.

To control the operation of the apparatus according to the invention, in particular to synchronise the operation of the feed device, the turning worm screw and the discharge device, the apparatus according to the invention can also have a control unit which has at least one signal input for detecting sensor signals and at least one signal output for outputting control signals to an actuating unit.

In principle, the control unit for controlling the feeding in of the elongate objects can be connected to a barrier or the like provided on the feed device, which barrier or the like releases the elongate objects at the right time in order for them to be conveyed along the feed device. However, this has the disadvantage that physical intervention with the elongate objects is required, which in turn entails an increased risk of damage. To address this situation, it is therefore proposed in a further development of the invention that the apparatus also comprises a sensor unit which is connected to at least one signal input of the control unit and is designed and intended to detect the position of at least one elongate object along the feed device, the at least one signal output of the control unit being connected to at least one signal input of a drive motor of the turning worm screw, and the control unit being configured to control the feed speed of a feed unit of the feed device and/or the speed of the turning worm screw in such a way that the at least one elongate object reaches the feed portion of the turning worm screw when the feed side delimiting wall has just released the feed portion.

A sensor for detecting the rotary position of the turning worm screw can also be provided for this purpose.

In order to allow the elongate objects to be fed in, the feed device can, according to a further embodiment, comprise a conveyor belt on which the elongate objects rest. As a result of this, not only can satisfactory freedom of design be ensured with respect to a feed path of the elongate objects, but a feed speed which can be easily varied depending on the desired throughput rate of the apparatus according to the invention can be provided.

If the elongate objects are to be grouped into groups of a predetermined number after being turned, for example for the purpose of being packaged at a later date at a packaging station that may be downstream of the apparatus according to the invention, it is also preferable for the discharge device to include a compartment collector of which the compartment units can be controlled preferably in groups or even completely independently of one another.

If the apparatus according to the invention comprises the control unit explained above as well as the compartment collector, then according to a further development of the invention the control unit can be designed to control the compartment collector on the basis of the rotary movement of the turning worm screw. For example, a compartment unit can always remain in the region of the discharge end of the turning worm screw until the turning worm screw has reached a rotary position at which the next elongate object has just arrived at the discharge end of the turning worm screw and thus on the compartment unit, and then, for the purpose of grouping this elongate object, is inserted behind the already filled compartment units.

In order to further facilitate the entry of the elongate objects into the feed portion of the turning worm screw, the control unit can, according to a further embodiment, be designed to vary the worm screw speed on the basis of the rotary position of the turning worm screw. The rotational speed can thus be lower during a rotary position in which the entry side delimiting wall releases the feed portion than in a rotary position in which the entry side delimiting wall blocks the feed portion of the turning worm screw. As a result of this, the elongate object has a larger time window for entering the feed portion and can be caught by the entry side delimiting wall as soon as it enters the feed portion, which delimiting wall is now rotating at an increased rotational speed.

It is not only in connection with the last-mentioned embodiment that it is advantageous if the turning worm screw has a low moment of inertia, such that, for example, the drive motor for operating the turning worm screw can be correspondingly slim, i.e. designed to save space, money and energy. According to a further embodiment of the invention, the feed side delimiting wall and the discharge side delimiting wall of the worm channel can therefore be formed by two helices formed along the turning worm screw. In other words, the feed side delimiting wall and the discharge side delimiting wall can each have an active wall surface which delimits the at least one worm channel and a passive wall surface which is opposite the active wall surface. The helices preferably each have a constant wall thickness along their extension. Additionally or alternatively, the turning worm screw can be hollow, at least in portions.

In the following the invention will be described in more detail using one embodiment with reference to the accompanying drawings, in which.

Figure 1:
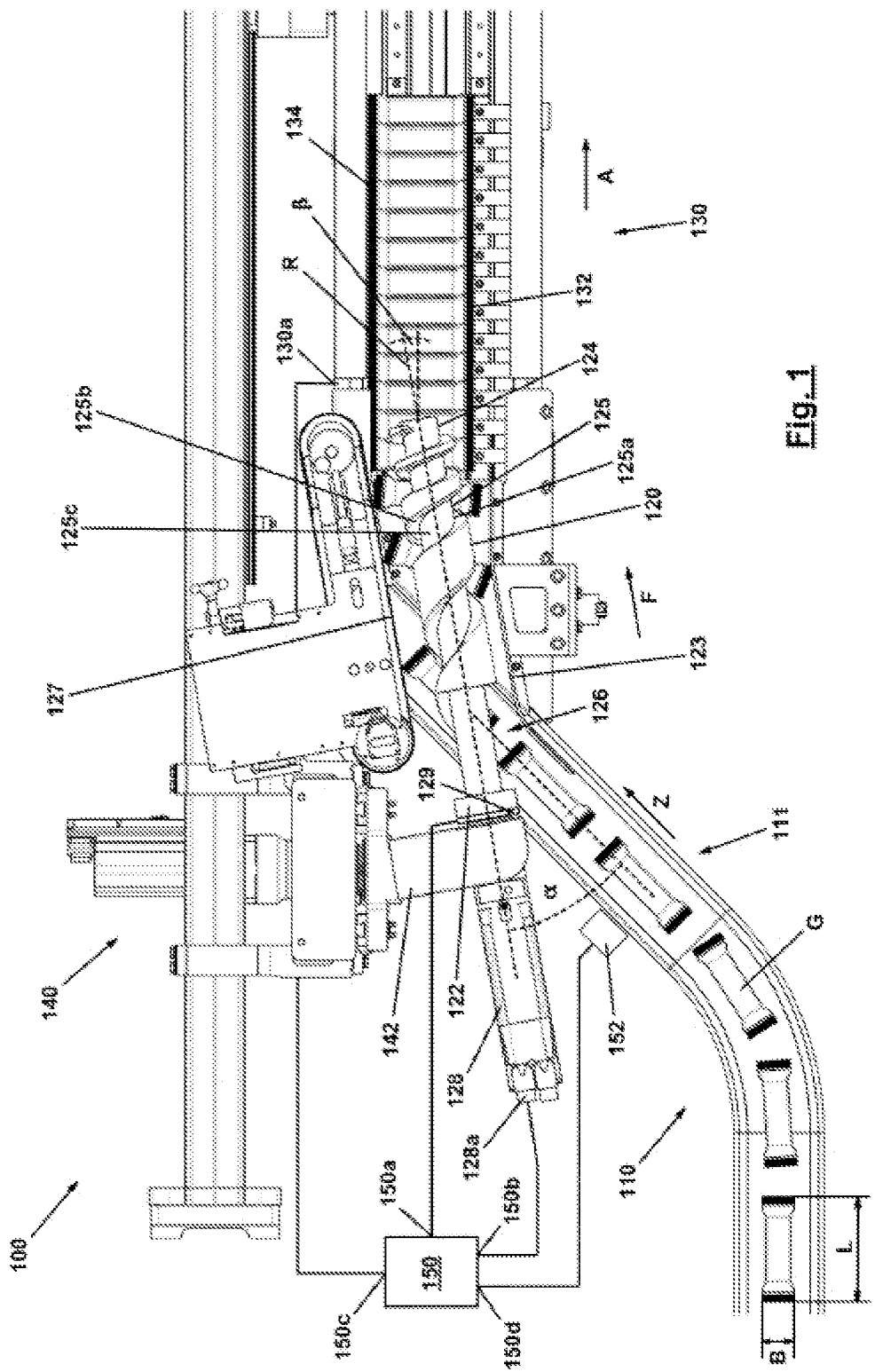
FIG. 1 is a plan view of an embodiment of an apparatus according to the invention.

In FIG. 1, an apparatus according to the invention is designated quite generally with the number 100. The apparatus 100 comprises a feed device 110 which is designed as a conveyor belt in the embodiment shown. Elongate objects G laying on the conveyor belt 110 are fed in by means of the conveyor belt 110 which moves in a feed direction Z when the apparatus 100 is in operation. The elongate objects G have a feed orientation in which they are conveyed with their narrow side, corresponding to the width B, facing forward. In the present embodiment, the elongate objects G are commercially available bars intended for consumption, which are packaged in a tubular film which has overlapping and sealed ends on its respective narrow sides.

The apparatus 100 also comprises a turning worm screw 120 having a feed end 122 and a discharge end 124 to which the elongate objects G are fed at the side via a feed path 111 of the conveyor belt 110 at a feed portion 126 of the turning worm screw 120.

The turning worm screw 120 can be hollow, at least in portions. The feed direction Z of the feed path 111 encloses, directly upstream of the turning worm screw 120, an angle α with an axis of rotation R of the turning worm screw 120, which angle is approximately 35° in the embodiment shown. To rotate the turning worm screw 120 about the axis of rotation R, a drive motor 128 is provided, to which the turning worm screw 120 is flanged at its feed end 122. A sensor 129 for detecting a rotary position of the turning worm screw 120 can also be provided at the connection point between the drive motor 128 and the turning worm screw 120. The drive motor 128 is in turn attached to a bracket 142 which supports the drive motor 128 and the drive torque of the drive motor 128. The bracket 142 can in turn be attached to one of these superordinate brackets 140, preferably in an adjustable manner.

The turning worm screw 120 is configured to convey the elongate objects G along a conveying direction F into a discharge device 130 and to transfer them from the feed orientation into a discharge orientation in which they are conveyed with their long side, corresponding to the length L, facing forward. The conveying direction F is substantially parallel to the axis of rotation R of the turning worm screw 120. To guide the elongate objects G in a direction orthogonal to the axis of rotation R or to the conveying direction F, a guide sheet 123 is arranged on the side of the turning worm screw 120 facing the feed path 111. A further guide unit 127 is arranged on the side of the turning worm screw 120 facing away from the feed path 111, which guide unit is designed as a guide belt rotating in the conveying direction F in the embodiment shown. The guide belt 127 preferably extends at a speed that substantially corresponds to the conveying speed of the elongate objects G in the conveying direction F, so that the sliding of the narrow sides of the elongate objects G on the guide belt 127 is reduced, preferably completely prevented.

In order to transfer the elongate objects G from the feed orientation into the discharge orientation, a worm channel 125 through which the elongate object G passes is formed on the turning worm screw 120, which worm channel is delimited by a feed side delimiting wall 125a, a discharge side delimiting wall 125b and an inner circumferential wall 125c. Both the feed side delimiting wall 125a and the discharge side delimiting wall 125b, which are each intended to engage with the long sides of the elongate object G, can also be provided with a friction-reducing coating, for example they can be teflonised. The geometry of the worm channel 125 will be explained in more detail below with reference to FIGS. 2 and 3.

In the embodiment shown, the discharge device 130 is designed as a compartment collector, which comprises a plurality of compartment units 132, which can be controlled or moved preferably in groups or even completely independently of one another, so that the elongate objects G can be grouped before they are, for example, fed to a packaging device (not shown) arranged downstream of the apparatus 100. The elongate objects G are discharged in a discharge direction A along a discharge path 134 which, directly downstream of the turning worm screw 120, encloses an angle β with the axis of rotation R of the turning worm screw 120, which angle is approximately 10° in the embodiment shown.

Figure 2:
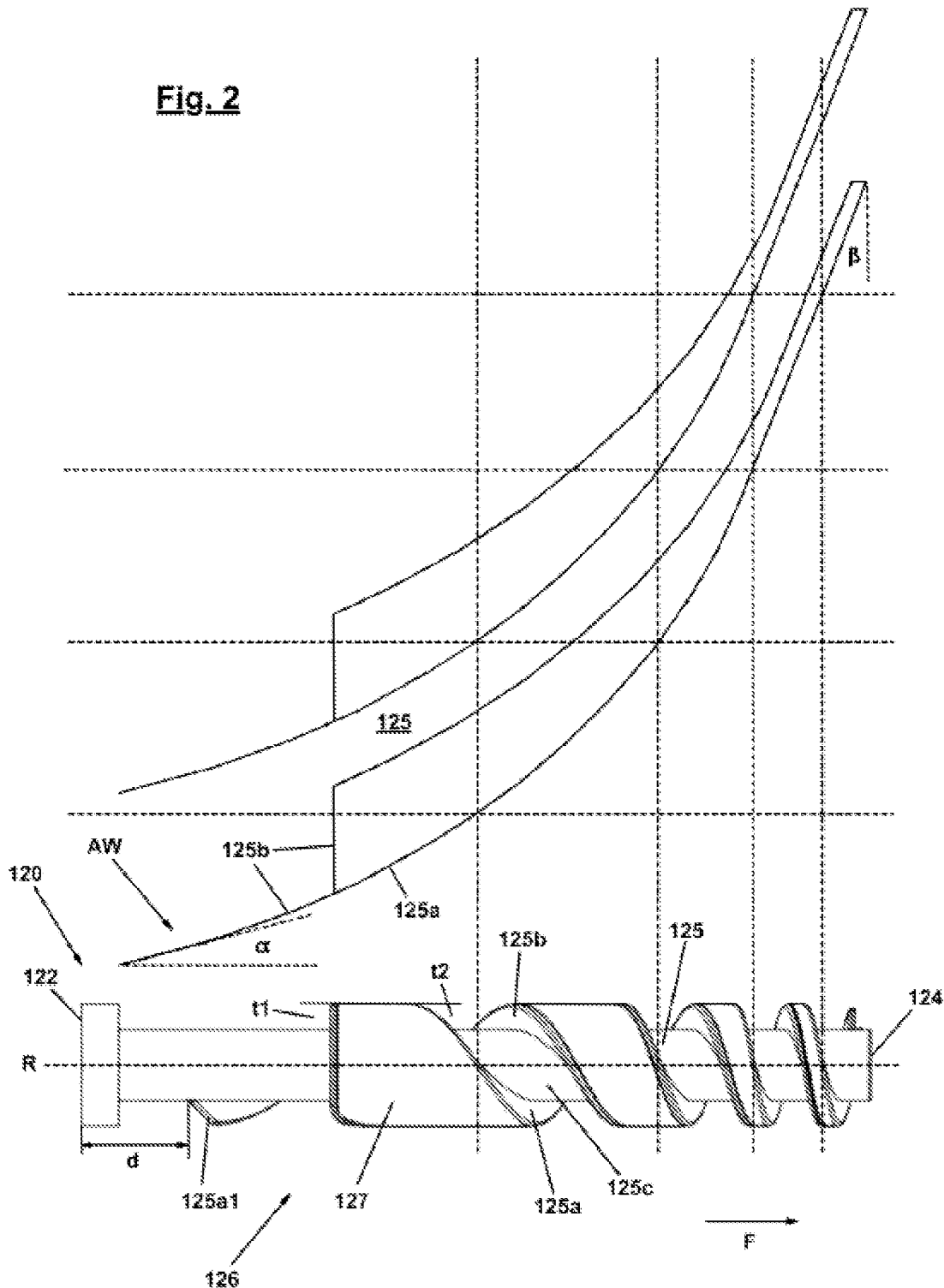
FIG. 2 is a side view of a turning worm screw of the apparatus according to the invention including a development of a worm screw helix of the turning worm screw.

With reference to FIG. 2, the turning worm screw 120 from FIG. 1, in particular the geometry of the worm channel 125, will now be described in more detail.

In addition to the turning worm screw 120 itself, FIG. 2 shows the development AW of a worm screw helix 127, which is delimited by the feed side delimiting wall 125a and by the discharge side delimiting wall 125b. As can be seen from the development AW, both the feed side delimiting wall 125a and the discharge side delimiting wall 125b have a screw pitch which reduces from the feed end 122 to the discharge end 124 of the turning worm screw 120. In the embodiment shown, the screw pitch in the region of the feed end 122 is approximately 35° and in the region of the discharge end 124 it is approximately 10°. In the present embodiment, the screw pitch in the region of the feed end 122 therefore corresponds to the angle α defined above, while the screw pitch in the region of the discharge end 124 corresponds to the angle β.

In order to allow the elongate object G to enter the worm channel 125 from the side with as little disruption as possible, the circumferential angular position of the discharge side delimiting wall 125b of the worm channel 125 on the side of the feed portion 126 facing away from the feed end 122 increases, in the circumferential direction, by 180°.

In order to be able to ensure that the feed side delimiting wall 125a also does not stand in the way of the elongate object G entering the feed portion 126, the height of the feed side delimiting wall 125a decreases towards the feed end 122 of the turning worm screw 120, which is shown in FIG. 2 by means of an outlet portion 125a1 of the feed side delimiting wall 125a. Furthermore, the feed side delimiting wall 125a is only formed at a predetermined distanced from the feed end 122 of the turning worm screw 120.

In addition, the depth of the worm channel 125 in the feed portion 126 of the turning worm screw 120 can have a smaller value than further along the turning worm screw 120. For example, the depth of the worm channel 125 in the feed portion 126 of the turning worm screw 120 can have a value $t_1$, while further along the turning worm screw 120 it has a value $t_2$, which is smaller than the value $t_1$. As a result of this, it is possible that the turning worm screw 120 in the region of the feed portion 126 comes into frictional engagement with the elongate objects G, which frictional engagement exerts a braking force on said objects, while further along the turning worm screw only the feed side delimiting wall 125a and possibly the discharge side delimiting wall 125b engage with the long sides of the elongate object G.

For a better overview, in FIG. 2 an image AW* of the development AW is also inserted, which image is offset upwards by approximately the width of the worm channel 125. In the image AW*, the feed side delimiting wall is correspondingly identified by the reference sign 125a* and that on the discharge side by the reference sign 125b*.

An elongate object G which approaches the feed portion 126 of the turning worm screw 120 at the side at the angle α, which elongate object has the feed orientation mentioned at the outset, consequently covers the path in FIG. 2 delimited by the image of the feed side delimiting wall 125a* and the discharge side delimiting wall 125b, which path corresponds to the worm channel 125, and, when conveyed in the conveying direction F, is turned in such a way that it leaves the worm channel 125 in the discharge orientation at the angle β, which corresponds to the screw pitch at the discharge end 124. The turning worm screw 120 has a mathematically negative direction of rotation about the axis of rotation R relative to a right-handed coordinate system. Due to the condition described above that the discharge direction A of the discharge path 134 directly downstream of the turning worm screw 120 encloses the angle β with the axis of rotation R of the turning worm screw 120, the elongate object G can fall into one of the compartment units 132 described in FIG. 1 when leaving the worm channel 125 without further turning being required, in order to then be discharged into the discharge orientation by means of the compartment collector 130 in discharge direction.

Figure 4:
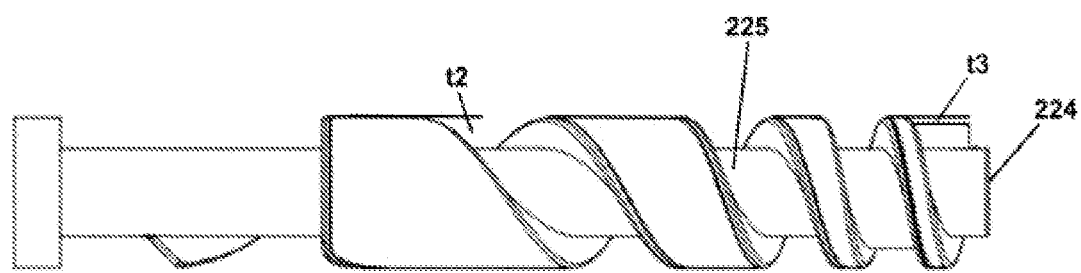
FIG. 4 is a side view of a second embodiment of a turning worm screw.

In order to be able to ensure that the elongate objects are reliably released from the worm channel, as shown in FIG. 4 for a second embodiment of the invention, the depth of the worm channel 225 in a portion adjacent to the discharge end 224 in the direction of the discharge end 224 can decrease, preferably continuously, from a greater depth value $t_2$ to a lower depth value $t_3$.

With further reference to FIG. 1, the apparatus 100 according to the embodiment shown also comprises a control unit 150, which is connected via a signal input 150a to the sensor 129 in order to detect the rotary position of the turning worm screw 120 and is connected via a signal output 150b to a signal input 128a of the drive motor 128.

Furthermore, the control unit 150 can be connected via a signal output 150c to a signal input 130a of the compartment collector 130 in order to be able to control the compartment collector 130 on the basis of the rotary movement of the turning worm screw 120.

Finally, the apparatus 100 can also comprise a further sensor unit 152, which is connected to a signal input 150d of the control unit 150 and is designed and intended to detect the position of at least one elongate object G along the conveyor belt 110, in particular the feed path 111, and the control unit 150 is configured to control the speed of the conveyor belt 110 and/or the speed of the turning worm screw 120 in such a way that the elongate object G then reaches the feed portion 126 of the turning worm screw 120 when the feed side delimiting wall 125a has just released the feed portion 126.

Figure 3:
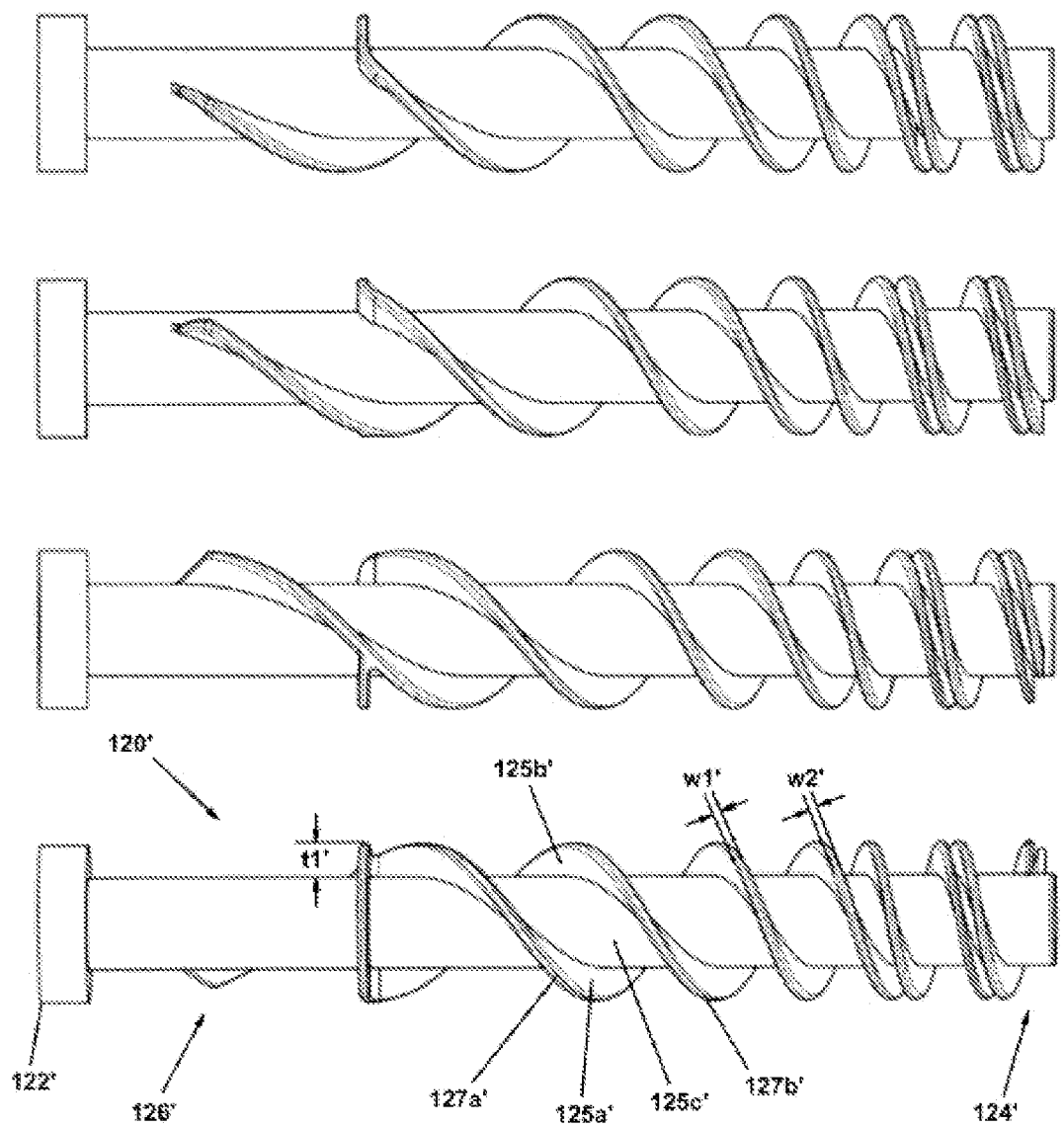
FIG. 3 is a total of four side views of an alternative embodiment of a turning worm screw of the apparatus according to the invention in different rotary positions.

Finally, FIG. 3 is a total of four side views of an alternative embodiment of a turning worm screw 120' in different rotary positions. The turning worm screw 120' can be attached to the apparatus 100 analogously to the turning worm screw 120 described above. It is therefore possible to replace the turning worm screw 120 from FIG. 1 introduced into the apparatus 100 with the turning worm screw 120'. In addition, the turning worm screw 120' will only be described below with respect to the features with regard to which it differs from the turning worm screw 120.

As can be seen in FIG. 3, the worm channel 125' is formed by two helices 127a' and 127b' formed along the turning worm screw 120'. The helices 127a' and 127b' preferably each have a constant wall thickness $w_1'$ or $w_2'$ along their extension. In other words, the feed side delimiting wall 125a' and the discharge side delimiting wall 125b' each have an active wall surface which delimits the at least one worm channel 125' and a passive wall surface which is opposite the active wall surface. As a result of this, the turning worm screw 120' can have a reduced moment of inertia compared to the turning worm screw 120. In addition, the turning worm screw 120' can also be hollow, at least in portions.

The invention claimed is:

1. An apparatus for turning an elongate object out of a feed orientation, in which the elongate object is conveyed with its narrow side, corresponding to its width, facing forward, into a discharge orientation, in which the elongate object is conveyed with its long side, corresponding to its length, facing forward, wherein a height of the elongate object is at most as great as its width and its width is less than its length, the apparatus comprising:
   a feed device;
   a turning worm screw comprising at least one worm channel open radially outwards,
      wherein the turning worm screw is delimited by a feed side delimiting wall, a discharge side delimiting wall, and a radially inner circumferential wall,
      wherein both the feed side delimiting wall and the discharge side delimiting wall of the at least one worm channel have a screw pitch which reduces from a feed end to a discharge end of the turning worm screw, wherein a feed path of the feed device approaches a feed portion of the turning worm screw at a side, wherein the feed portion adjoins the feed end of the turning worm screw, and
      wherein a circumferential angular position of the discharge side delimiting wall of the at least one worm channel on the side of the feed portion of the turning worm screw facing away from the feed end increases, in the circumferential direction, by at least one hundred eighty degrees (180°) divided by a number of worm channels; and
   a discharge device, wherein the discharge device is assigned to the discharge end of the turning worm screw.

2. The apparatus of claim 1, wherein a height of the feed side delimiting wall decreases towards the feed end of the turning worm screw.

3. The apparatus of claim 1, wherein the feed side delimiting wall is only formed at a predetermined distance from the feed end of the turning worm screw.

4. The apparatus of claim 1, wherein a feed direction of the feed path directly upstream of the turning worm screw encloses a predetermined angle with an axis of rotation of the turning worm screw, wherein the predetermined angle is between approximately twenty degrees (20°) and approximately fifty degrees (50°).

5. The apparatus of claim 4, wherein the predetermined angle is approximately thirty five degrees (35°).

6. The apparatus of claim 1, wherein a discharge direction of a discharge path directly downstream of the turning worm screw encloses a predetermined angle with an axis of rotation of the turning worm screw, wherein the predetermined angle is between zero degrees (0°) and approximately twenty degrees (20°).

7. The apparatus of claim 6, wherein the predetermined angle is approximately ten degrees (10°).

8. The apparatus of claim 1, wherein (1) a direction of rotation of the turning worm screw and (2) dimensions of a depth of the worm channel, at least in the feed portion are configured such that the turning worm screw enters into frictional engagement with the elongate object, wherein the frictional engagement exerts a braking force on the elongate object.

9. The apparatus of claim 1, wherein one or more of the feed side delimiting wall or the discharge side delimiting wall has a low-friction surface finish.

10. The apparatus of claim 9, wherein the one or more of the feed side delimiting wall or the discharge side delimiting wall is provided with a friction-reducing coating.

11. The apparatus of claim 1, wherein a depth of the worm channel in the feed portion of the turning worm screw has a smaller value than further along the turning worm screw.

12. The apparatus of claim 1, wherein a guide unit is arranged on the side of the turning worm screw facing the feed path.

13. The apparatus of claim 12, wherein a further guide unit other than the guide unit is arranged on the side of the turning worm screw facing away from the feed path.

14. The apparatus of claim 12, wherein the guide unit comprises a guide sheet or a rotating guide belt.

15. The apparatus of claim 1, further comprising:
   an actuating unit; and
   a control unit having at least one signal input for detecting sensor signals and at least one signal output for outputting control signals to the actuating unit.

16. The apparatus of claim 15, further comprising:
   a sensor unit connected to at least one signal input of the control unit and configured to detect a position of the elongate object along the feed device,
   wherein the at least one signal output of the control unit is connected to at least one signal input of a drive motor of the turning worm screw, and
   wherein the control unit is configured to control one or more of the feed speed of a feed unit of the feed device or a rotational speed of the turning worm screw such that the elongate object reaches the feed portion of the turning worm screw when the feed side delimiting wall has released the feed portion.

17. The apparatus of claim 15, wherein the control unit is configured to vary the worm screw speed based on a rotary position of the turning worm screw.

18. The apparatus of claim 1, further comprising a sensor for detecting a rotary position of the turning worm screw.

19. The apparatus of claim 1, wherein the feed device comprises a conveyor belt on which the elongate object rests.

20. The apparatus of claim 1, wherein the discharge device comprises a compartment collector, wherein compartment units are controllable via the compartment collector.

21. The apparatus of claim 20, wherein the control unit is configured to control the compartment collector based on rotary movement of the turning worm screw.

22. The apparatus of claim 20, wherein the compartment units are controllable in groups or are controllable independently of one another.

23. The apparatus of claim 1, wherein one or more of (A) the feed side delimiting wall and the discharge side delimiting wall of the turning worm channel are formed by two helices formed along the turning worm screw or (B) the turning worm screw is hollow at least in portions.

24. The apparatus of claim 1, wherein a depth of the worm channel in a portion adjacent to the discharge end decreases in a direction of the discharge end from a first depth value to a second depth value.

25. The apparatus of claim 24, wherein the depth of the worm channel in a portion adjacent to the discharge end decreases continuously.

* * * * *